(12) United States Patent
Bunno et al.

(10) Patent No.: US 10,393,170 B2
(45) Date of Patent: Aug. 27, 2019

(54) BEARING STRUCTURE AND TURBOCHARGER

(71) Applicant: IHI Corporation, Koto-ku (JP)

(72) Inventors: Kenji Bunno, Tokyo (JP); Yutaka Uneura, Tokyo (JP); Shinichi Kaneda, Tokyo (JP); Yuichi Daito, Tokyo (JP); Hideyuki Kojima, Tokyo (JP); Tomomi Sugiura, Tokyo (JP); Shunsuke Nishii, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/886,302

(22) Filed: Feb. 1, 2018

(65) Prior Publication Data

US 2018/0156268 A1 Jun. 7, 2018

Related U.S. Application Data

(63) Continuation of application No. PCT/JP2016/072174, filed on Jul. 28, 2016.

(30) Foreign Application Priority Data

Aug. 11, 2015 (JP) .................................. 2015-158838

(51) Int. Cl.
*F16C 17/10* (2006.01)
*F16C 33/06* (2006.01)
(Continued)

(52) U.S. Cl.
CPC .............. *F16C 17/10* (2013.01); *F01D 25/18* (2013.01); *F02B 39/14* (2013.01); *F16C 32/06* (2013.01);
(Continued)

(58) Field of Classification Search
CPC .......... F16C 17/10; F16C 17/18; F16C 32/06; F16C 33/06; F16C 33/74; F16C 33/1025;
(Continued)

(56) References Cited

U.S. PATENT DOCUMENTS 3,043,636 A * 7/1962 MacInnes ............. F01D 25/166
384/287
4,474,484 A * 10/1984 MacInnes ............. F01D 25/164
384/215

(Continued)

FOREIGN PATENT DOCUMENTS

CN 102733932 A 10/2012
CN 103649495 A 3/2014

(Continued)

OTHER PUBLICATIONS

International Search Report dated Oct. 25, 2016 in PCT/JP2016/072174, filed on Jul. 28, 2016.

(Continued)

*Primary Examiner* — Marcus Charles
(74) *Attorney, Agent, or Firm* — Oblon, McClelland, Maier & Neustadt, L.L.P.

(57) ABSTRACT

A bearing structure includes: a housing; a bearing hole formed in the housing; a bearing, which is provided in the bearing hole, and is configured to axially support a shaft having one end provided with a turbine impeller; a space, which is formed in the housing, and is positioned between the impeller and the bearing hole; a passage, which communicates with the space, and extends to a vertically lower side of the bearing hole; a communication opening portion, which allows the passage and the bearing hole to communicate with each other; and a lower wall portion, which is provided in a lower portion including a portion directly below an axis of the shaft between the passage and the bearing hole, and has an inner wall surface being opposed to (Continued)

the shaft and having a curved surface shape with a curvature center positioned on the shaft side.

15 Claims, 5 Drawing Sheets

(51) Int. Cl.
    *F16C 43/02*     (2006.01)
    *F16C 33/74*     (2006.01)
    *F02B 37/00*     (2006.01)
    *F01D 25/18*     (2006.01)
    *F02B 39/14*     (2006.01)
    *F16C 32/06*     (2006.01)
    *F16C 33/10*     (2006.01)

(52) U.S. Cl.
    CPC .......... *F16C 33/06* (2013.01); *F16C 33/1025* (2013.01); *F16C 33/74* (2013.01); *F16C 43/02* (2013.01); *F02B 37/00* (2013.01); *F05D 2220/40* (2013.01); *F05D 2260/609* (2013.01); *F16C 2360/24* (2013.01)

(58) Field of Classification Search
    CPC .. F16C 43/02; F16C 2360/24; F16C 33/1045; F16C 33/103; F01D 25/166; F01D 25/168; F01D 25/186; F05D 2220/40; F02B 37/00; F02B 39/14
    USPC .............. 384/107, 286, 368, 606, 901, 397; 415/106, 110, 229, 170.1
    See application file for complete search history.

(56) References Cited

U.S. PATENT DOCUMENTS

| | | | | |
|---|---|---|---|---|
| 5,121,605 A * | 6/1992 | Oda | ............................ | F01D 5/10 290/52 |
| 5,857,332 A | 1/1999 | Johnston et al. | | |
| 5,904,471 A * | 5/1999 | Woollenweber | ........ | F02B 37/16 417/307 |
| 6,449,950 B1 * | 9/2002 | Allen | .................... | F01D 25/166 417/407 |
| 7,673,452 B2 * | 3/2010 | Shimizu | .................. | F01D 25/12 290/52 |
| 8,152,489 B2 * | 4/2012 | Shimizu | .................. | F01D 15/10 417/405 |
| 8,157,543 B2 * | 4/2012 | Shimizu | ................. | F01D 25/166 417/407 |
| 8,622,691 B2 * | 1/2014 | Eguchi | .................. | F01D 25/168 384/107 |
| 9,140,185 B2 * | 9/2015 | Castan | ....................... | F02C 6/12 |
| 2010/0218499 A1 * | 9/2010 | Shibui | ..................... | F02B 37/10 60/607 |
| 2010/0266430 A1 * | 10/2010 | Shimizu | .................. | F02B 37/10 417/423.8 |
| 2010/0310366 A1 * | 12/2010 | Eguchi | .................. | F01D 25/168 415/229 |
| 2012/0263589 A1 * | 10/2012 | Iwata | ....................... | F16C 17/02 415/229 |
| 2014/0127051 A1 | 5/2014 | Takahashi et al. | | |
| 2015/0078884 A1 * | 3/2015 | Uneura | ............... | F16C 33/1065 415/104 |
| 2015/0240871 A1 * | 8/2015 | Oki | ........................ | F16C 33/106 384/397 |
| 2016/0348577 A1 * | 12/2016 | Uneura | ................... | F01D 25/20 |

FOREIGN PATENT DOCUMENTS

| | | |
|---|---|---|
| CN | 104863701 A | 8/2015 |
| EP | 2 913 485 A1 | 9/2015 |
| JP | 61-149742 U | 9/1986 |
| JP | 61-202646 U | 12/1986 |
| JP | 61-202647 U | 12/1986 |
| JP | 11-2136 A | 1/1999 |
| JP | 2001-289052 A | 10/2001 |
| JP | 2004-132319 A | 4/2004 |
| JP | 2010-270673 A | 12/2010 |
| JP | 2012-26303 A | 2/2012 |
| JP | 2013-19323 A | 1/2013 |
| JP | 2014-43804 A | 3/2014 |
| JP | 2014-47732 A | 3/2014 |
| JP | 2014-152635 A | 8/2014 |
| JP | 2014-238009 A | 12/2014 |
| JP | 2015-161179 A | 9/2015 |
| WO | WO 98/28527 A1 | 7/1998 |
| WO | WO 2013/008591 A1 | 1/2013 |
| WO | 2 733 327 A1 | 5/2014 |

OTHER PUBLICATIONS

International Preliminary Report on Patentability and Written Opinion dated Feb. 22, 2018 in PCT/JP2016/072174.

Decision to Grant dated Sep. 11, 2018 in Japanese Patent Application No. 2017-534178, (with English translation), 6 pages.

\* cited by examiner

BEARING STRUCTURE AND TURBOCHARGER

CROSS REFERENCE TO RELATED APPLICATIONS

This application is a continuation application of International Application No. PCT/JP2016/072174, filed on Jul. 28, 2016, which claims priority to Japanese Patent Application No. 2015-158838, filed on Aug. 11, 2015, the entire contents of which are incorporated by reference herein.

BACKGROUND ART

Technical Field

The present disclosure relates to a bearing structure which is configured to axially support a shaft, and to a turbocharger.

Related Art

Hitherto, there has been known a turbocharger in which a shaft is axially supported so as to be rotatable in a bearing housing. A turbine impeller is provided at one end of the shaft, and a compressor impeller is provided at another end of the shaft. The turbocharger is connected to an engine. The turbine impeller is rotated by exhaust gas discharged from the engine. The rotation of the turbine impeller causes the compressor impeller to rotate through the shaft. The turbocharger compresses air along with the rotation of the compressor impeller and delivers the compressed air to the engine.

In a turbocharger disclosed in Patent Literature 1, an annular semi-floating bearing is received in a bearing hole formed in a housing. A shaft is axially supported by oil film pressure of lubricating oil supplied to a gap between the semi-floating bearing and the shaft. Then, the lubricating oil passes through the gap between the semi-floating bearing and the shaft. After that, the lubricating oil flows out to a space formed at an end portion of the bearing hole in an axial direction. The lubricating oil having flowed out to the space flows down through a passage formed on a vertically lower side and is discharged to an outside of the housing. Further, in the configuration disclosed in Patent Literature 1, a cutout portion is formed at an end portion on the turbine impeller side of the wall portion on the vertically lower side in the bearing hole. The cutout portion allows the bearing hole and the passage to communicate with each other. With this configuration, oil discharge performance for discharging the lubricating oil from the bearing hole is enhanced.

CITATION LIST

Patent Literature

Patent Literature 1: Japanese Patent Application Laid-Open No. 2014-047732

SUMMARY

Technical Problem

In the turbocharger, as disclosed in Patent Literature 1 described above, a communication portion such as a cutout portion for allowing a bearing hole and a passage to communicate with each other is formed in some cases. In this case, part of the lubricating oil is directly ejected to the passage through the bearing hole without passing through the space. When the amount of ejection is excessively large, a wall of lubricating oil ejected from the communication portion is formed in the passage. As a result, when the lubricating oil having passed through the space flows down through the passage, the flow may be hindered by the wall of the lubricating oil ejected from the communication portion. Therefore, there is a fear in that the oil discharge performance is degraded.

An object of the present disclosure is to provide a bearing which is capable of improving oil discharge performance, and a turbocharger.

Solution to Problem

In order to achieve the above problem, according to one embodiment of the present discloser, there is provided a bearing structure, including: a housing; a bearing hole formed in the housing; a bearing, which is provided in the bearing hole, and is configured to axially support a shaft having one end provided with an impeller; a space, which is formed in the housing, and is positioned between the impeller and the bearing hole; a passage, which communicates with the space, and extends to a vertically lower side of the bearing hole; a communication opening portion, which allows the passage and the bearing hole to communicate with each other; and a lower wall portion, which is provided in a lower portion including a portion directly below an axis of the shaft between the passage and the bearing hole, and has an inner wall surface being opposed to the shaft and having a curved surface shape with a curvature center positioned on the shaft side.

The inner wall surface may extend in a rotation direction of the shaft along an outer circumferential surface of the shaft.

The communication opening portion may be formed in each of a front side and a rear side in the rotation direction of the shaft with respect to the lower wall portion.

The communication opening portion may be formed only within a range on a rear side in the rotation direction of the shaft with respect to the lower portion including the portion directly below the axis of the shaft.

The bearing structure may further include a clearance groove, which is formed in an inner circumferential surface of the bearing hole, and is separated apart from the space in an axial direction of the shaft, and the communication opening portion may allow the passage and the clearance groove to communicate with each other.

In the clearance groove, at an opposed wall portion opposed to the shaft with a predetermined gap to the shaft in a radial direction of the shaft, there may be formed a narrow portion having a smaller gap with the shaft on the rear side in the rotation direction of the shaft over the portion directly above the axis of the shaft as compared to the front side in the rotation direction.

The bearing structure may further include a large-diameter portion, which is formed in the shaft, is positioned between the space and the clearance groove, and has a diameter larger than a diameter of the inner circumferential surface of the bearing hole. The lower wall portion may project from the portion directly below the large-diameter portion to the clearance groove side, and the space may be positioned on the impeller side.

In order to achieve the above problem, according to one embodiment of the present disclosure, there is provided a turbocharger, including the above-mentioned bearing structure.

Effects of Disclosure

According to the present disclosure, the oil discharge performance can be improved.

DESCRIPTION OF EMBODIMENT

Now, with reference to the attached drawings, an embodiment of the present disclosure is described in detail. The dimensions, materials, and other specific numerical values represented in the embodiment are merely examples used for facilitating the understanding of the present disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

Figure 1:
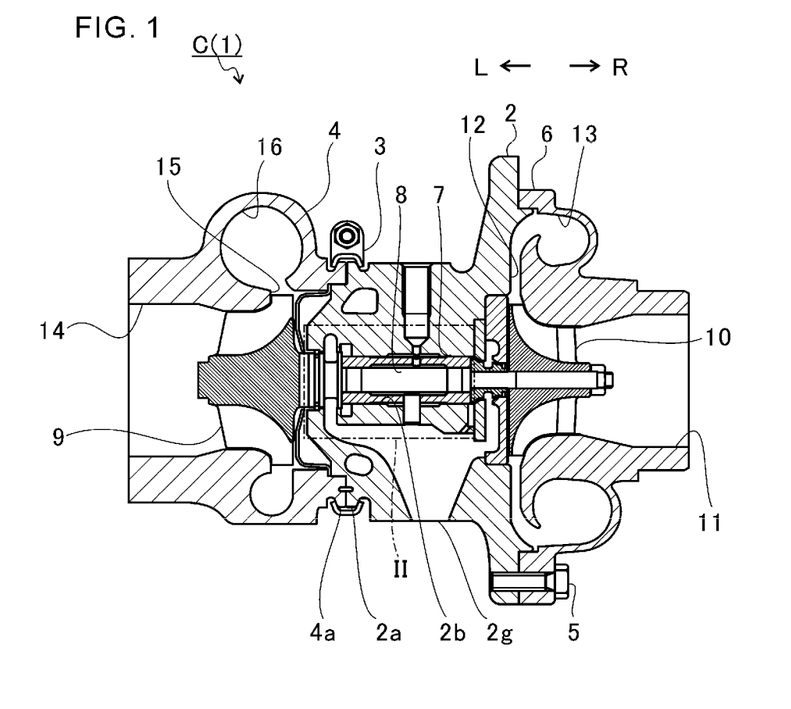
FIG. 1 is a schematic sectional view of a turbocharger.

FIG. 1 is a schematic sectional view of a turbocharger C. In the following description, the direction indicated by the arrow L illustrated in FIG. 1 corresponds to a left side of the turbocharger C, and the direction indicated by the arrow R illustrated in FIG. 1 corresponds to a right side of the turbocharger C. As illustrated in FIG. 1, the turbocharger C includes a turbocharger main body 1. The turbocharger main body 1 includes a bearing housing 2 (housing). A turbine housing 4 is coupled to the left side of the bearing housing 2 by a fastening mechanism 3. A compressor housing 6 is coupled to the right side of the bearing housing 2 by a fastening bolt 5. The bearing housing 2, the turbine housing 4, and the compressor housing 6 are integrally formed.

On an outer circumferential surface of the bearing housing 2 in the vicinity of the turbine housing 4, there is formed a projection 2a. The projection 2a projects in a radial direction of the bearing housing 2. Further, on an outer circumferential surface of the turbine housing 4 in the vicinity of the bearing housing 2, there is formed a projection 4a. The projection 4a projects in a radial direction of the turbine housing 4. The bearing housing 2 and the turbine housing 4 are fixed to each other by band-fastening the projections 2a and 4a with the fastening mechanism 3. The fastening mechanism 3 is constructed by, for example, a G-coupling for clamping the projections 2a and 4a.

The bearing housing 2 has a bearing hole 2b. The bearing hole 2b penetrates in a right-and-left direction of the turbocharger C. A shaft 8 is axially supported so as to be rotatable by a semi-floating bearing 7 (bearing), which is provided to the bearing hole 2b. A turbine impeller 9 (impeller) is integrally fixed to a left end portion of the shaft 8. The turbine impeller 9 is received in the turbine housing 4 so as to be rotatable. Further, a compressor impeller 10 (impeller) is integrally fixed to a right end portion of the shaft 8. The compressor impeller 10 is received in the compressor housing 6 so as to be rotatable.

The compressor housing 6 has an intake port 11, which is opened on the right side of the turbocharger C. The intake port 11 is connected to an air cleaner (not shown). Further, under a state in which the bearing housing 2 and the compressor housing 6 are coupled to each other by the fastening bolt 5, a diffuser flow passage 12 is formed by opposed surfaces of the bearing housing 2 and the compressor housing 6. In the diffuser flow passage 12, the air is pressurized. The diffuser flow passage 12 is annularly formed so as to extend from a radially inner side to a radially outer side of the shaft 8. The diffuser flow passage 12, on the above-mentioned radially inner side, communicates with the intake port 11 via the compressor impeller 10.

Further, the compressor housing 6 has an annular compressor scroll flow passage 13. The compressor scroll flow passage 13 is positioned on the radially outer side of the shaft 8 with respect to the diffuser flow passage 12. The compressor scroll flow passage 13 communicates with an intake port of an engine (not shown). The compressor scroll flow passage 13 communicates also with the diffuser flow passage 12. Thus, when the compressor impeller 10 is rotated, air is sucked into the compressor housing 6 through the intake port 11. Further, the sucked air is increased in speed by a centrifugal force during a course of flowing through blades of the compressor impeller 10. The air having been increased in speed is increased in pressure in the diffuser flow passage 12 and the compressor scroll flow passage 13, and is introduced to the intake port of the engine.

The turbine housing 4 has a discharge port 14. The discharge port 14 is opened on the left side of the turbocharger C. Further, the discharge port 14 is connected to an exhaust gas purification device (not shown). Further, a flow passage 15 and an annular turbine scroll flow passage 16 are formed in the turbine housing 4. The turbine scroll flow passage 16 is positioned on the radially outer side of the turbine impeller 9 with respect to the flow passage 15. The turbine scroll flow passage 16 communicates with a gas inflow port (not shown). The exhaust gas discharged from an exhaust gas manifold of the engine (not shown) is introduced to the gas inflow port. Further, the turbine scroll flow passage 16 communicates also with the flow passage 15. Thus, the exhaust gas introduced through the gas inflow port to the turbine scroll flow passage 16 is introduced to the discharge port 14 through the flow passage 15 and the turbine impeller 9. The exhaust gas to be introduced to the discharge port 14 causes the turbine impeller 9 to rotate in the process of flowing therethrough.

Then, a rotational force of the turbine impeller 9 is transmitted to the compressor impeller 10 through the shaft 8. The rotational force of the compressor impeller 10 causes the air to be increased in pressure and introduced to the intake port of the engine as described above.

Figure 2:
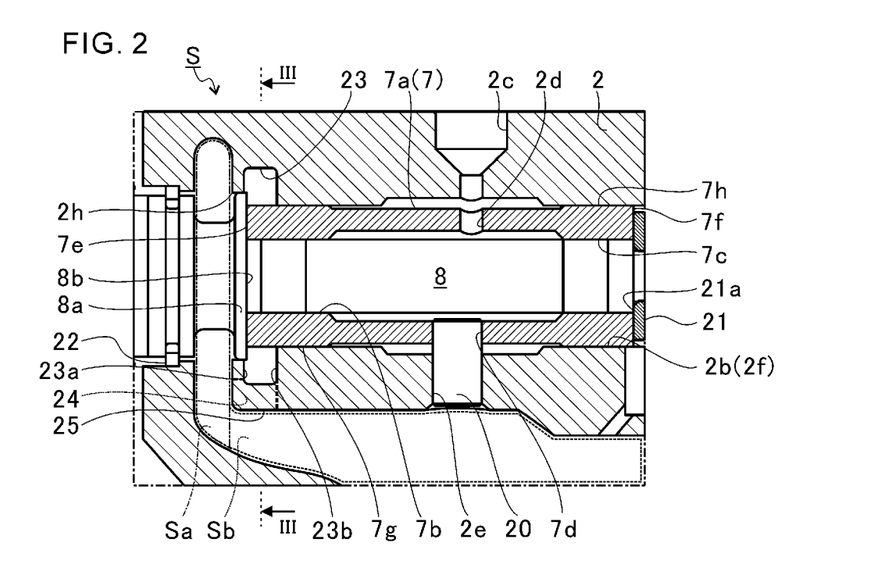
FIG. 2 is an extraction view of the one-dot chain line portion of FIG. 1.

FIG. 2 is an extraction view of the one-dot chain line portion of FIG. 1. As illustrated in FIG. 2, a bearing structure S is provided in the bearing housing 2. In the bearing structure S, the lubricating oil flows into the bearing hole 2b through an oil passage 2c formed in the bearing housing 2.

The lubricating oil having flowed into the bearing hole 2b is supplied to the semi-floating bearing 7 provided in the bearing hole 2b.

The semi-floating bearing 7 includes an annular main body portion 7a. The shaft 8 is inserted to the main body portion 7a. On an inner circumferential surface of the main body portion 7a, there are formed two bearing surfaces 7b and 7c. The two bearing surfaces 7b and 7c are separated apart in an axial direction of the shaft 8 (hereinafter simply referred to as "axial direction").

In the main body portion 7a, there is formed an oil hole 2d which penetrates from the inner circumferential surface to the outer circumferential surface. Part of the lubricating oil supplied to the bearing hole 2b flows into the inner circumferential surface of the main body portion 7a through the oil hole 2d. The lubricating oil having flowed into the inner circumferential surface of the main body portion 7a is supplied to a gap between the shaft 8 and the bearing surfaces 7b and 7c. The shaft 8 is axially supported by oil film pressure of the lubricating oil supplied to the gap between the shaft 8 and the bearing surfaces 7b and 7c.

Further, the main body portion 7a has a through hole 7d. The through hole 7d penetrates from the inner circumferential surface to the outer circumferential surface of the main body portion 7a. The bearing housing 2 has a pin hole 2e formed at a portion opposed to the through hole 7d. The pin hole 2e penetrates through a wall portion forming the bearing hole 2b. A positioning pin 20 is held in the pin hole 2e from a lower side of FIG. 2 by, for example, press-fitting. A tip of the positioning pin 20 is inserted to the through hole 7d of the semi-floating bearing 7. With this configuration, the positioning pin 20 regulates rotation and axial movement of the semi-floating bearing 7.

Further, an oil thrower member 21 is fixed to the shaft 8 more on the right side in FIG. 2 (compressor impeller 10 side) than the main body portion 7a. The oil thrower member 21 is an annular member. The oil thrower member 21 causes the lubricating oil, which flows to the compressor impeller 10 side along the shaft 8, to be diffused to the radially outer side. That is, the oil thrower member 21 suppresses leakage of the lubricating oil to the compressor impeller 10 side.

The oil thrower member 21 is opposed to the main body portion 7a in the axial direction. An outer diameter of an opposed surface 21a of the oil thrower member 21 with respect to the main body portion 7a is larger than an inner diameter of the bearing surface 7c. Further, for example, the outer diameter of the opposed surface 21a is smaller than an outer diameter of the main body portion 7a.

The shaft 8 has a large-diameter portion 8a. The large-diameter portion 8a has an outer diameter which is larger than an inner diameter of the bearing surface 7b of the main body portion 7a. Further, for example, the outer diameter of the large-diameter portion 8a is larger than an outer diameter of the main body portion 7a. The large-diameter portion 8a is positioned on the left side in FIG. 2 (turbine impeller 9 side) with respect to the main body portion 7a. The large-diameter portion 8a is opposed to the main body portion 7a in the axial direction.

As described above, the main body portion 7a is sandwiched between the oil thrower member 21 and the large-diameter portion 8a in the axial direction. Further, the positioning pin 20 regulates movement of the main body portion 7a in the axial direction. The lubricating oil is supplied to each of a gap between the main body portion 7a and the oil thrower member 21 and a gap between the main body portion 7a and the large-diameter portion 8a. When the shaft 8 moves in the axial direction, the oil thrower member 21 or the large-diameter portion 8a is supported by the oil film pressure at the gap formed with the main body portion 7a. That is, both end surfaces of the main body portion 7a of the semi-floating bearing 7 in the axial direction are bearing surfaces 7e and 7f. The bearing surfaces 7e and 7f receive thrust load.

Further, damper portions 7g and 7h are formed on both end sides of the outer circumferential surface of the main body portion 7a in the axial direction. The damper portions 7g and 7h suppress oscillation of the shaft 8 by the oil film pressure of the lubricating oil supplied to a gap formed with the inner circumferential surface 2f of the bearing hole 2b.

As described above, part of the lubricating oil supplied to the bearing surfaces 7b and 7e and the damper portion 7g flows out from the bearing hole 2b to the turbine impeller 9 side. In the bearing housing 2, a space Sa is formed between the turbine impeller 9 and the bearing hole 2b. The space Sa is continuous with the bearing hole 2b in the axial direction of the shaft 8. Further, the space Sa extends in the rotation direction of the shaft 8 to the radially outer side with respect to the bearing hole 2b. The lubricating oil having flowed out from the bearing hole 2b to the turbine impeller 9 side is diffused to the radially outer side in the space Sa by the centrifugal force caused by rotation with the shaft 8.

The space Sa communicates with a passage Sb on the vertically lower side (lower side in FIG. 2) of the bearing hole 2b. For example, the space Sa continues to the passage Sb. However, a step may be formed between an inner wall surface of the space Sa and an inner wall surface of the passage Sb. The passage Sb extends on the vertically lower side of the bearing hole 2b in the bearing housing 2. The passage Sb communicates with an oil discharge port 2g, which is formed on the lower side (vertically lower side) of FIG. 1, in the bearing housing 2 illustrated in FIG. 1.

The lubricating oil having been diffused to the vertically upper side with respect to the shaft 8 in the space Sa flows down to the vertically lower side with respect to the shaft 8 along the inner wall of the bearing housing 2 forming the space Sa. The lubricating oil having flowed down merges with the lubricating oil having been diffused to the vertically lower side with respect to the shaft 8 in the space Sa. The merged lubricating oil is introduced to the passage Sb. The lubricating oil having been introduced to the passage Sb flows down through the passage Sb toward the oil discharge port 2g. The lubricating oil having flowed down is discharged to the outside of the bearing housing 2.

A seal ring 22 is arranged between the space Sa and the turbine impeller 9. The seal ring 22 is positioned in a gap between the shaft 8 and the bearing housing 2 in the radial direction. The seal ring 22 suppresses leakage of the lubricating oil from the space Sa side to the turbine impeller 9 side.

As described above, the seal ring 22 suppresses the leakage of the lubricating oil to the turbine impeller 9 side. However, when the amount of the lubricating oil flowing out from the bearing hole 2b to the space Sa is excessively large, the sealing performance of the seal ring 22 is degraded. Therefore, in this embodiment, a clearance groove 23 is formed in the inner circumferential surface 2f of the bearing hole 2b.

The clearance groove 23 is separated apart from the space Sa to the center side of the bearing hole 2b in the axial direction of the shaft 8. The part of the lubricating oil having been supplied to the bearing surfaces 7b and 7e and the damper portion 7g flows into the clearance groove 23.

Further, an opposed surface 8b of the large-diameter portion 8a with respect to the main body portion 7a is positioned on a radially inner side of the clearance groove 23. Further, the opposed surface 8b is positioned more on a side separated from the turbine impeller 9 than the inner wall surface 23a of the clearance groove 23 on the turbine impeller 9 side. Thus, the lubricating oil having lubricated the bearing surfaces 7b and 7e is likely to flow into the clearance groove 23 along the opposed surface 8b. Further, the clearance groove 23 is positioned on the radially outer side of the main body portion 7a. Therefore, the lubricating oil having passed through a gap between the damper portion 7g and the bearing hole 2b is likely to flow into the clearance groove 23.

Further, the outer diameter of the large-diameter portion 8a is larger than the outer diameter of the main body portion 7a. Therefore, the lubricating oil having flowed in the axial direction from the damper portion 7g along the outer circumferential surface of the main body portion 7a is changed in flow direction to the radial direction by the large-diameter portion 8a and is likely to flow into the clearance groove 23.

Figure 3:
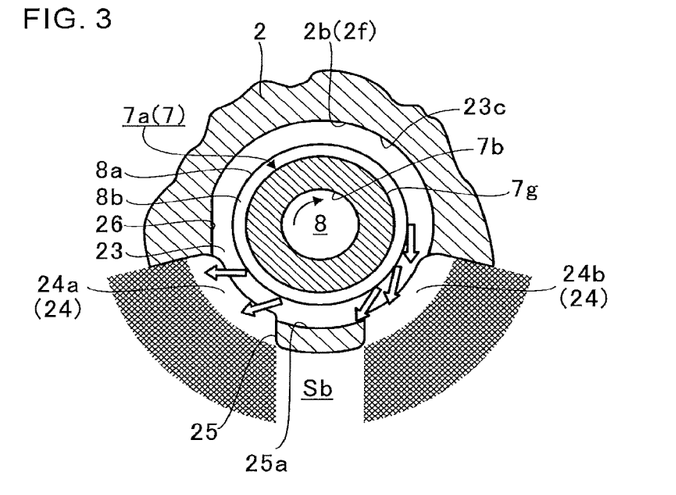
FIG. 3 is a sectional view taken along the line III-III of 2.

FIG. 3 is a sectional view taken along the line III-III of FIG. 2. In FIG. 3, for easy understanding, the bearing housing 2 is partially omitted by illustration with a break line. Further, in FIG. 3, illustration of a portion on an outer side of the passage Sb in the radial direction of the shaft 8 is omitted.

As illustrated in FIG. 3, the bearing housing 2 has a communication opening portion 24. The communication opening portion 24 penetrates through a partition wall which partitions the bearing hole 2b and the passage Sb of the bearing housing 2 in the radial direction of the shaft 8. The communication opening portion 24 allows the clearance groove 23 (bearing hole 2b) and the passage Sb to communicate with each other. The communication opening portion 24 introduces the lubricating oil having flowed into the clearance groove 23 to the passage Sb.

The lubricating oil rotated together with rotation of the large-diameter portion 8a is diffused by the centrifugal force. With this action, the lubricating oil having been diffused to the upper side from the shaft 8 in the clearance groove 23 flows down to the lower side from the shaft 8 along the inner wall of the clearance groove 23. The lubricating oil having flowed down merges with the lubricating oil having been diffused to the lower side from the shaft 8 in the clearance groove 23. Then, the merged lubricating oil is ejected from the communication opening portion 24 to the passage Sb. As described above, part of the lubricating oil is directly ejected from the bearing hole 2b to the passage Sb without passing through the space Sa. Therefore, the amount of the lubricating oil flowing to the turbine impeller 9 side with respect to the large-diameter portion 8a is suppressed. In such a manner, the leakage of the lubricating oil from the seal ring 22 to the turbine impeller 9 side is suppressed.

Figure 4A:
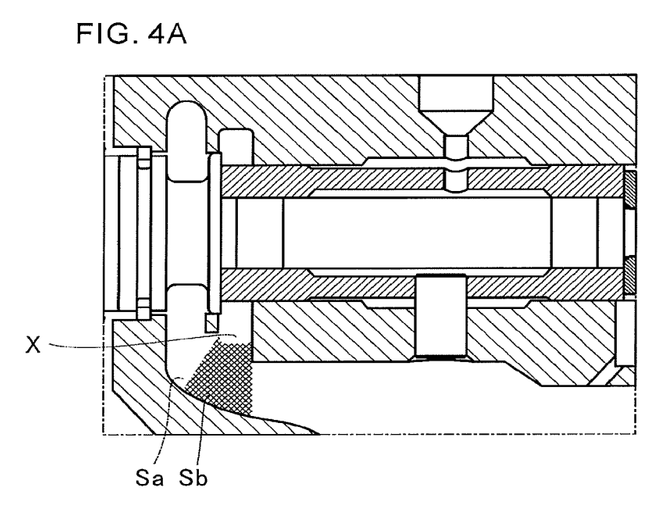
FIG. 4A is an extraction view of a position corresponding to FIG. 2 in a comparative example.
Figure 4B:
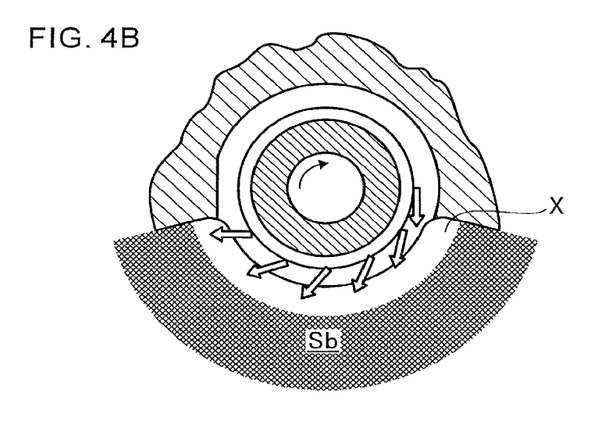
FIG. 4B is an extraction view of a position corresponding to FIG. 3 in the comparative example.

FIG. 4A is an extraction view of a position corresponding to FIG. 2 in a comparative example. FIG. 4B is an extraction view of a position corresponding to FIG. 3 in the comparative example.

In the comparative example, it is assumed that the amount of the lubricating oil ejected through a communication opening portion X to the passage Sb is excessively large. In this case, as illustrated in FIG. 4A and FIG. 4B, a wall of the lubricating oil ejected from the communication opening portion X (illustrated with cross-hatching in FIG. 4A and FIG. 4B) is formed in the passage Sb. As a result, when the lubricating oil having passed through the space Sa flows down through the passage Sb, the flow may be hindered by the wall of the lubricating oil ejected from the communication opening portion X. Therefore, the oil discharge performance is degraded.

Therefore, in this embodiment, a division wall portion 25 (lower wall portion) is provided. The division wall portion 25 divides the communication opening portion 24 into a plurality of portions in the rotation direction (clockwise direction in FIG. 3) of the shaft 8. The division wall portion 25 is positioned in a lower portion (lower side portion) including a portion directly below an axis of the shaft 8. In the division wall portion 25, an inner wall surface 25a opposed to the shaft 8 has a curved surface shape. A curvature center of the inner wall surface 25a is positioned on the shaft 8 side with respect to the inner wall surface 25a. The inner wall surface 25a is formed so as to extend in the rotation direction (circumferential direction) of the shaft 8. The inner wall surface 25a has a curved surface shape. On the curved surface shape, in the up-and-down direction of FIG. 3, both ends of the inner wall surface 25a in the rotation direction of the shaft 8 projects vertically above the central portion of the region extending in the rotation direction of the shaft 8 (a central portion of the inner wall surface 25a extending in a rotation direction). The inner wall surface 25a extends along the outer circumferential surface of the shaft 8. A distance from the outer circumferential surface of the shaft 8 to the inner wall surface 25a is substantially constant along the rotation direction of the shaft 8. Further, consideration is made of an imaginary line with an assumption that an opposed wall portion 23c described later extends to a phase of the rotation direction of the inner wall surface 25a. The division wall portion 25 may be formed so that the opposed wall portion 23c substantially matches with the imaginary line. As illustrated in FIG. 2, the division wall portion 25 extends along the axial direction of the clearance groove 23. The division wall portion 25 has the space Sa on the turbine impeller 9 side and projects from the lower portion including a portion directly below the large-diameter portion 8a to the clearance groove 23 side. The division wall portion 25 extends in the axial direction from a radially outer side of the inner wall surface 23b of the clearance groove 23 on the right side (compressor impeller 10 side) of FIG. 2 to a portion directly below the large-diameter portion 8a (to the near side of the space Sa).

Specifically, as illustrated in FIG. 2, an annular projection 2h is formed in the bearing housing 2 on the radially outer side with respect to the large-diameter portion 8a. The annular projection 2h annularly surrounds the large-diameter portion 8a. Further, the annular projection 2h projects toward the radially inner side with respect to the bottom surface of the clearance groove 23. The division wall portion 25 extends from the annular projection 2h to a wall portion on an opposite side over the clearance groove 23 in the axial direction.

Referring back to FIG. 3, in the communication opening portion 24 divided by the division wall portion 25, the front side in the rotation direction of the shaft 8 is referred to as a front side opening portion 24a. Further, in the communication opening portion 24, the rear side in the rotation direction of the shaft 8 is referred to as a rear side opening portion 24b. Along with the rotation of the shaft 8, the lubricating oil having flowed as indicated by the outlined arrows in FIG. 3 flows out from the front side opening portion 24a and the rear side opening portion 24b.

The direction of the flow of the lubricating oil is changed by the division wall portion 25. The lubricating oil is not directly ejected to the vertically lower side of the division wall portion 25. Therefore, a gap can be formed in the wall of the lubricating oil ejected from the communication opening portion 24 to the passage Sb. In such a manner, the closure of the passage Sb is avoided. Therefore, when the lubricating oil having passed through the space Sa flows down through the passage Sb, the flow is less liable to be hindered by the wall of the lubricating oil ejected from the communication opening portion 24. In such a manner, the oil discharge performance is improved.

Further, in the clearance groove 23, the opposed wall portion 23*c* is opposed to the shaft 8 with a predetermined gap in the radial direction. The lubricating oil flows in the rotation direction of the shaft 8 between the outer circumferential surface of the shaft 8 and the opposed wall portion 23*c* of the clearance groove 23. Part of the lubricating oil is discharged from the rear side opening portion 24*b*. Remainder of the lubricating oil passes through a gap between the outer circumferential surface of the shaft 8 and the inner wall surface 25*a* of the division wall portion 25 and flows to the front side opening portion 24*a*. As described above, the inner wall surface 25*a* of the division wall portion 25 has a curved surface shape with a curvature center positioned on the shaft 8 side. Therefore, a flow of the lubricating oil passing through the gap between the outer circumferential surface of the shaft 8 and the inner wall surface 25*a* of the division wall portion 25 becomes smoother. As a result, diffusion of the lubricating oil from the inner wall surface 25*a* of the division wall portion 25 to the shaft 8 is suppressed. Thus, adhesion of the lubricating oil to the shaft 8 is suppressed. In such a manner, the oil discharge performance is improved.

Further, the inner wall surface 25*a* of the division wall portion 25 extends along the outer circumferential surface of the shaft 8. Therefore, the flow of the lubricating oil passing through the gap between the outer circumferential surface of the shaft 8 and the inner wall surface 25*a* of the division wall portion 25 becomes yet smoother. As a result, the adhesion of the lubricating oil to the shaft 8 is effectively suppressed, thereby further improving the oil discharge performance. Further, the division wall portion 25 may be integrally formed in the bearing housing 2 as an inner wall surface being continuous with the opposed wall surface 23*c*. In this case, the bearing housing 2 is partially removed by machine working such as cutting so that the front side opening portion 24*a* and the rear side opening portion 24*b* are formed. As a result, the bearing housing 2 which remains between the front side opening portion 24*a* and the rear side opening portion 24*b* becomes the division wall portion 25. Thus, the division wall portion 25 can easily be formed.

In the opposed wall portion 23*c*, a narrow portion 26 is formed at a portion being continuous with the front side opening portion 24*a* in the rotation direction of the shaft 8. The narrow portion 26 is a wall surface extending in the vertical direction (up-and-down direction in FIG. 3). The narrow portion 26 has a smaller gap in the radial direction of the shaft 8 than a portion on the front side in the rotation direction of the shaft 8 with respect to the narrow portion 26 in the opposed wall portion 23*c*.

It is assumed that the lubricating oil having flowed into the clearance groove 23 does not flow out from the communication opening portion 24 to the passage Sb but flows through the narrow portion 26 in the rotation direction along with the rotation of the shaft 8. However, the gap between the narrow portion 26 and the shaft 8 in the radial direction is small. Therefore, the amount of the lubricating oil to be thrown upward is suppressed. As a result, the lubricating oil is less liable to be thrown upward to the clearance groove 23. Thus, the amount of the lubricating oil discharged from the front side opening portion 24*a* to the passage Sb is increased. In such a manner, the oil discharge performance is improved.

Description is made of the case where the narrow portion 26 is formed so as to continue from the front side opening portion 24*a* to the front side in the rotation direction of the shaft 8. However, the narrow portion 26 may be formed on the rear side in the rotation direction of the shaft 8 over a portion directly above the axis of the shaft 8. Further, the narrow portion 26 only needs to be smaller in gap with the shaft 8 than the front side in the rotation direction of the shaft 8 over the portion directly above the axis of the shaft 8. For example, the narrow portion 26 may be formed apart from the front side opening portion 24*a* in the rotation direction.

Further, in the opposed wall portion 23*c*, there may be formed a portion which continues from the rear side opening portion 24*b* to the rear side in the rotation direction of the shaft 8 so that the gap with the shaft 8 is increased. In this case, the lubricating oil is efficiently discharged to the rear side opening portion 24*b* along with the rotation of the shaft 8. In such a manner, the oil discharge performance is improved.

Figure 5:
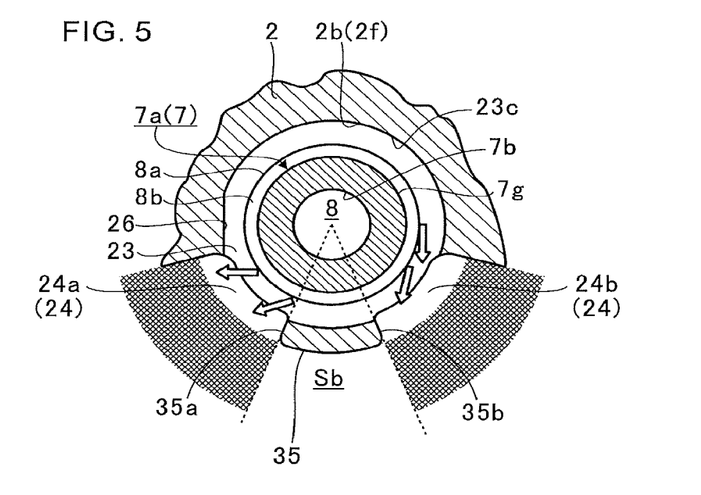
FIG. 5 is an explanatory view for illustrating a first modification example.

FIG. 5 is an explanatory view for illustrating a first modification example. In FIG. 5, there is illustrated an extraction view of a position corresponding to FIG. 3 in the first modification example. As illustrated in FIG. 5, in the first modification example, the division wall portion 25 has a substantially fan shape in cross-sectional shape perpendicular to the axis of the shaft 8. The division wall portion 35 (lower wall portion) has a wall surface 35*a* and a wall surface 35*b*. The wall surface 35*a* is formed on the front side opening portion 24*a* side. The wall surface 35*b* is formed on the rear side opening portion 24*b* side. The wall surface 35*a* and the wall surface 35*b* extend along the radial direction of the shaft 8 in the cross section perpendicular to the axial direction.

Therefore, the lubricating oil having flowed out from the front side opening portion 24*a* and the rear side opening portion 24*b* flows in a direction away from the division wall portion 35 in the right-and-left direction of FIG. 5. Therefore, the gap formed in the wall of the lubricating oil in the passage Sb can be increased. In such a manner, the oil discharge performance is further improved.

Figure 6:
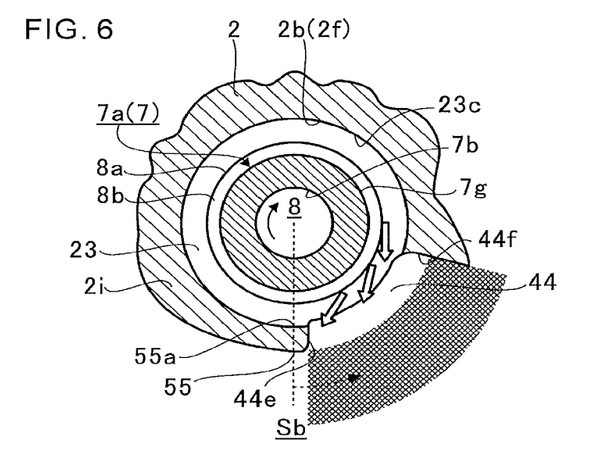
FIG. 6 is an explanatory view for illustrating a second modification example.

FIG. 6 is an explanatory view for illustrating a second modification example. In FIG. 6, there is illustrated an extraction view of a position corresponding to FIG. 3 in the second modification example. As illustrated in FIG. 6, in the second modification example, the division wall portion 25 is not formed. Instead, a continuous wall portion 55 (lower wall portion) is formed in a lower portion including a portion directly below the axis of the shaft 8. The continuous wall portion 55 is a part of a wall portion 2*i* (inner circumferential surface 2*f*) forming the clearance groove 23 in the bearing housing 2. The wall portion 2*i* extends at least from the portion directly above the axis of the shaft 8 to the continuous wall portion 55 toward the rear side in the rotation direction of the shaft 8. For example, the continuous wall portion 55 slightly extends to the rear side in the rotation direction of the shaft 8 with including the portion directly below the shaft 8. The communication opening portion 44 extends toward the rear side in the rotation direction from the continuous wall portion 55 on the rear side (indicated by the broken-line arrow in FIG. 6) in the rotation direction of the shaft 8 (clockwise direction in FIG. 6) with respect to the portion directly below the axis of the shaft 8. In other words, the communication opening portion 44 allows the passage Sb and the bearing hole 2*b* to communicate with each other only within the range on the rear side in the rotation direction of the shaft 8 with respect to the portion directly below the axis of the shaft 8.

Inner wall surfaces 44e and 44f form the communication opening portion 44. The inner wall surface 44e is a wall surface positioned on the front side in the rotation direction of the shaft 8 in the communication opening portion 44. In other words, the inner wall surface 44e is an end surface on the rear side in the rotation direction of the shaft 8 in the continuous wall portion 55. The inner wall surface 44e is positioned on the rear side in the rotation direction with respect to the vertically lower side of the axis of the shaft 8. The wall portion 2i forming the clearance groove 23 extends from the inner wall surface 44e (end surface of the continuous wall portion 55) to the inner wall surface 44f toward the front side in the rotation direction of the shaft 8.

In the continuous wall portion 55, an inner wall surface 55a opposed to the shaft 8 has a curved surface shape, similarly to the inner wall surface 25a of the division wall portion 25 described above. A curvature center of the inner wall surface 55a is positioned on the shaft 8 side with respect to the inner wall surface 55a. The inner wall surface 55a extends along the outer circumferential surface of the shaft 8. A distance of the inner wall surface 55a from the outer circumferential surface of the shaft 8 is substantially constant along the rotation direction of the shaft 8. The continuous wall portion 55 extends along the axial direction of the clearance groove 23. Similarly to the division wall portion 25 described above, the continuous wall portion 55 is formed so as to project with the space Sa on the turbine impeller 9 side from a lower portion including a portion directly below the large-diameter portion 8a to the clearance groove 23 side. The continuous wall portion 55 extends in the axial direction from the radially outer side of the inner wall surface 23b (see FIG. 2) on the compressor impeller 10 side in the clearance groove 23 to the lower portion including the portion directly below the large-diameter portion 8a (near side of space Sa).

The lubricating oil flows in the rotation direction of the shaft 8 between the outer circumferential surface of the shaft 8 and the opposed wall portion 23c of the clearance groove 23. At this time, part of the lubricating oil is discharged from the communication opening portion 44. Remainder of the lubricating oil passes through the gap between the outer circumferential surface of the shaft 8 and the inner wall surface 55a of the continuous wall portion 55 and flows into the clearance groove 23. As described above, the inner wall surface 55a of the continuous wall portion 55 has a curved surface shape with the curvature center positioned on the shaft 8 side. Therefore, the flow of the lubricating oil passing through the gap between the outer circumferential surface of the shaft 8 and the inner wall surface 55a of the continuous wall portion 55 becomes smoother. As a result, diffusion of the lubricating oil from the inner wall surface 55a of the continuous wall portion 55 to the shaft 8 is suppressed. Thus, adhesion of the lubricating oil to the shaft 8 is suppressed. In such a manner, the oil discharge performance is improved. Further, the inner wall surface 55a of the continuous wall portion 55 extends along the outer circumferential surface of the shaft 8. Therefore, the flow of the lubricating oil passing through the gap between the outer circumferential surface of the shaft 8 and the inner wall surface 55a of the continuous wall portion 55 becomes yet smoother. As a result, the oil discharge performance is further improved. Further, the continuous wall portion 55 is formed integrally with the bearing housing 2. The communication opening portion 44 is formed, for example, by removing a part of the bearing housing 2 by machine working such as cutting. As a result, the bearing housing 2 remaining on the front side in the rotation direction of the shaft 8 from the communication opening portion 44 becomes the continuous wall portion 55. Therefore, the continuous wall portion 55 can easily be formed.

In FIG. 6, as indicated by the outlined arrows, the lubricating oil flows out from the communication opening portion 44 to the passage Sb. However, on the front side in the rotation direction of the shaft 8 with respect to the inner wall surface 44e, the lubricating oil is blocked by the bearing housing 2. Therefore, a gap can be formed in the wall of the lubricating oil ejected from the communication opening portion 44 to the passage Sb. In this manner, the oil discharge performance is improved.

Figure 7:
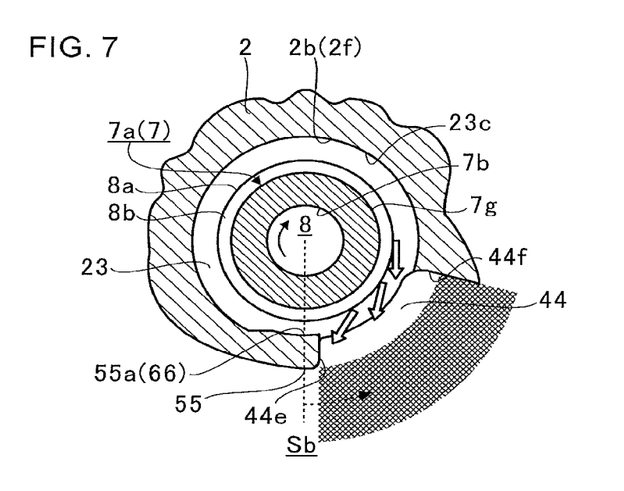
FIG. 7 is an explanatory view for illustrating a third modification example.

FIG. 7 is an explanatory view for illustrating a third modification example. In FIG. 7, there is illustrated an extraction view of a position corresponding to FIG. 6 in the third modification example. As illustrated in FIG. 7, in the third modification example, a narrow portion 66 is formed in addition to the configuration of the second modification example. Similarly to the narrow portion 26 of the above-mentioned embodiment, in the opposed wall portion 23c, the gap with the shaft 8 in the radial direction is narrower than the portion on the front side in the rotation direction of the shaft 8 from the narrow portion 66. Herein, the narrow portion 66 is formed in the inner wall surface 55a of the continuous wall portion 55. That is, the inner wall surface 55a of the continuous wall portion 55 is arranged closer to the shaft 8 than the portion on the front side in the rotation direction of the shaft 8, to thereby form the narrow portion 66. Similarly to the second modification example described above, the inner wall surface 55a (narrow portion 66) has a curved surface shape extending along the outer circumferential surface of the shaft 8. However, the narrow portion 66 may be formed on the front side in the rotation direction of the shaft 8 with respect to the inner wall surface 55a of the continuous wall portion 55.

A force which causes the lubricating oil having flowed into the clearance groove 23 to flow through the narrow portion 66 in the rotation direction along with the rotation of the shaft 8 without flowing out from the communication opening portion 44 to the passage Sb (with which lubricating oil is thrown upward) acts by a centrifugal force. However, the gap between the narrow portion 66 and the shaft 8 in the radial direction is narrow. Therefore, the amount of the lubricating oil to be thrown upward can be suppressed. As a result, the lubricating oil is less liable to be thrown upward to the clearance groove 23. The lubricating oil can be efficiently discharged from the communication opening portion 44 to the passage Sb. In such a manner, the oil discharge performance is improved.

Description is made of the case in which the narrow portion 66 is formed continuously from the boundary with the communication opening portion 44 (end portion on the rear side of the narrow portion 66 in the rotation direction) to the front side in the rotation direction of the shaft 8. However, the end portion of the narrow portion 66 on the rear side in the rotation direction may be formed, for example, apart from the communication opening portion 44 in the rotation direction. The narrow portion 66 only needs to be formed on the rear side in the rotation direction of the shaft 8 over the portion directly above the axis of the shaft 8 (reference line in the up-and-down direction intersecting the axis of the shaft 8). Further, the narrow portion 26 only needs to be smaller in gap with the shaft 8 than the front side in the rotation direction of the shaft 8 over the portion directly above the axis of the shaft 8.

In the above-mentioned embodiment and the first modification example, description is made of the case in which the communication opening portion 24 is divided into two portions in the rotation direction of the shaft 8. However, the communication opening portion 24 may be divided into three or more portions in the rotation direction of the shaft 8.

Further, in the above-mentioned embodiment and the first modification example, description is made of the case in which the communication opening portion 24 and the division wall portions 25 and 35 are provided on the turbine impeller 9 side of the bearing hole 2*b*. However, the communication opening portion 24 and the division wall portions 25 and 35 may be provided on the compressor impeller 10 side of the bearing hole 2*b*. Similarly, in the above-mentioned second modification example and third modification example, description is made of the case in which the communication opening portion 44 is provided on the turbine impeller 9 side of the bearing hole 2*b*. However, the communication opening portion 44 may be provided on the compressor impeller 10 side of the bearing hole 2*b*.

Further, in the above-mentioned embodiment and modification examples, description is made with the semi-floating bearing 7 as an example of the bearing. However, in place of the semi-floating bearing 7, there may be provided a full-floating metal or ball bearing which rotate in the rotation direction of the shaft 8.

Further, in the above-mentioned embodiment and modification examples, description is made of the case in which an outer diameter of the opposed surface 21*a* opposed to the main body portion 7*a* in the oil thrower member 21 is smaller than an outer diameter of the main body portion 7*a*. However, the outer diameter of the opposed surface 21*a* may be equal to the outer diameter of the main body portion 7*a* or may be larger than the outer diameter of the main body portion 7*a*.

Further, in the above-mentioned embodiment and modification examples, description is made of the case in which the clearance groove 23 is formed. However, the clearance groove 23 is not an indispensable configuration. However, a flow of the lubricating oil flowing in the axial direction can easily be changed to the radial direction by forming the clearance groove 23. Therefore, the lubricating oil is likely to flow out from the communication opening portions 24 and 44 to the passage Sb. As a result, the oil discharge performance is improved.

Further, in the above-mentioned embodiment and modification examples, description is made of the case in which the opposed surface 8*b* opposed to the main body portion 7*a* in the large-diameter portion 8*a* is positioned on the radially inner side of the clearance groove 23. That is, description is made of the case in which the clearance groove 23 is positioned on the radially outer side of the bearing surface 7*e* of the semi-floating bearing 7. However, the clearance groove 23 is not limited to be positioned on the radially outer side of the bearing surface 7*e* of the semi-floating bearing 7. However, when the clearance groove 23 is positioned on the radially outer side of the bearing surface 7*e* of the semi-floating bearing 7, the following effect is achieved. That is, the lubricating oil ejected in the radial direction from the gap between the bearing surface 7*e* and the large-diameter portion 8*a* is efficiently discharged. In such a manner, the oil discharge performance is further improved.

Further, in the above-mentioned embodiment and modification examples, description is made of the case in which the division wall portions 25 and 35 and the continuous wall portion 55 are positioned directly below the axis of the shaft 8. However, the division wall portions 25 and 35 and the continuous wall portion 55 may be arranged so as to avoid the portion directly below the axis of the shaft 8. However, when at least a part of the division wall portions 25 and 35 and the continuous wall portion 55 is positioned directly below the axis of the shaft 8, the following effect is achieved. That is, the division wall portions 25 and 35 and the continuous wall portion 55 reasonably block the lubricating oil flowing down to the vertically lower side by receiving the gravity. The division wall portion 25 and 35 and the continuous wall portion 55 enables a gap to be easily formed in the wall of the lubricating oil in the passage Sb.

Further, in the above-mentioned embodiment, first modification example, and third modification example, description is made of the case in which the narrow portions 26 and 66 are provided. However, the narrow portions 26 and 66 are not indispensable configurations. The narrow portions 26 and 66 may be omitted.

Further, in the above-mentioned embodiment and modification examples, description is made of the case in which the division wall portions 25 and 35 and the continuous wall portion 55 are formed integrally with the bearing housing 2. However, the division wall portion 25 and 35 and the continuous wall portion 55 may be formed separately from the bearing housing 2 and mounted to a portion directly below the axis of the shaft 8.

The embodiment of the present disclosure has been described above with reference to the attached drawings, but, needless to say, the present disclosure is not limited to the embodiment. It is apparent that those skilled in the art may arrive at various alternations and modifications within the scope of claims, and those examples are construed as naturally falling within the technical scope of the present disclosure.

INDUSTRIAL APPLICABILITY

The present disclosure is applicable to a bearing structure which is configured to axially support a shaft, and to a turbocharger.

What is claimed is:

1. A bearing structure, comprising:
    a housing;
    a bearing hole formed in the housing;
    a bearing, which is provided in the bearing hole, and is configured to axially support a shaft having one end provided with an impeller;
    a space, which is formed in the housing, and is positioned between the impeller and the bearing hole;
    a passage, which communicates with the space, and extends to a vertically lower side of the bearing hole;
    a communication opening portion, which allows the passage and the bearing hole to communicate with each other; and
    a lower wall portion, which is provided in a lower portion including a portion directly below an axis of the shaft between the passage and the bearing hole, and has an inner wall surface being opposed to the shaft and having a curved surface shape with a curvature center positioned on a shaft side.

2. A bearing structure according to claim 1, wherein the inner wall surface extends in a rotation direction of the shaft along an outer circumferential surface of the shaft.

3. A bearing structure according to claim 2, wherein the communication opening portion is formed in each of a front side and a rear side in the rotation direction of the shaft with respect to the lower wall portion.

4. A bearing structure according to claim 2, wherein the communication opening portion is formed only within a range on a rear side in the rotation direction of the shaft with respect to the lower portion including the portion directly below the axis of the shaft.

5. A bearing structure according to claim 2, further comprising a clearance groove, which is formed in an inner circumferential surface of the bearing hole, and is separated apart from the space in an axial direction of the shaft,
wherein the communication opening portion allows the passage and the clearance groove to communicate with each other.

6. A bearing structure according to claim 5, wherein, in the clearance groove, at an opposed wall portion opposed to the shaft with a predetermined gap to the shaft in a radial direction of the shaft, the bearing structure has a narrow portion having a smaller gap with the shaft on a rear side in a rotation direction of the shaft over the portion directly above the axis of the shaft as compared to a front side in the rotation direction.

7. A bearing structure according to claim 6, further comprising a large-diameter portion, which is formed in the shaft, is positioned between the space and the clearance groove, and has a diameter larger than a diameter of the inner circumferential surface of the bearing hole,
wherein the lower wall portion projects from a portion directly below the large-diameter portion to a clearance groove side, and the space is positioned on an impeller side.

8. A bearing structure according to claim 5, further comprising a large-diameter portion, which is formed in the shaft, is positioned between the space and the clearance groove, and has a diameter larger than a diameter of the inner circumferential surface of the bearing hole,
wherein the lower wall portion projects from a portion directly below the large-diameter portion to a clearance groove side, and the space is positioned on an impeller side.

9. A bearing structure according to claim 1, wherein the communication opening portion is formed in each of a front side and the rear side in a rotation direction of the shaft with respect to the lower wall portion.

10. A bearing structure according to claim 1, wherein the communication opening portion is formed only within a range on a rear side in a rotation direction of the shaft with respect to the lower portion including the portion directly below the axis of the shaft.

11. A bearing structure according to claim 1, further comprising a clearance groove, which is formed in an inner circumferential surface of the bearing hole, and is separated apart from the space in an axial direction of the shaft,
wherein the communication opening portion allows the passage and the clearance groove to communicate with each other.

12. A bearing structure according to claim 11, wherein, in the clearance groove, at an opposed wall portion opposed to the shaft with a predetermined gap to the shaft in a radial direction of the shaft, the bearing structure has a narrow portion having a smaller gap with the shaft on a rear side in a rotation direction of the shaft over the portion directly above the axis of the shaft as compared to a front side in the rotation direction.

13. A bearing structure according to claim 12, further comprising a large-diameter portion, which is formed in the shaft, is positioned between the space and the clearance groove, and has a diameter larger than a diameter of the inner circumferential surface of the bearing hole,
wherein the lower wall portion projects from a portion directly below the large-diameter portion to a clearance groove side, and the space is positioned on an impeller side.

14. A bearing structure according to claim 11, further comprising a large-diameter portion, which is formed in the shaft, is positioned between the space and the clearance groove, and has a diameter larger than a diameter of the inner circumferential surface of the bearing hole,
wherein the lower wall portion projects from a portion directly below the large-diameter portion to a clearance groove side, and the space is positioned on an impeller side.

15. A turbocharger, comprising the bearing structure of claim 1.

* * * * *